(12) United States Patent
Ma et al.

(10) Patent No.: US 12,216,347 B2
(45) Date of Patent: Feb. 4, 2025

(54) BACKLIGHT MODULE, DISPLAY MODULE, AND DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Yong Ma, Beijing (CN); Haifeng Xu, Beijing (CN); Xiaochun Shi, Beijing (CN); Jinfeng Zhang, Beijing (CN); Tao Liu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/021,185

(22) PCT Filed: Mar. 28, 2022

(86) PCT No.: PCT/CN2022/083455
§ 371 (c)(1),
(2) Date: Feb. 14, 2023

(87) PCT Pub. No.: WO2023/184100
PCT Pub. Date: Oct. 5, 2023

(65) Prior Publication Data
US 2024/0264478 A1    Aug. 8, 2024

(51) Int. Cl.
*G02F 1/1333*    (2006.01)
*F21V 8/00*    (2006.01)

(52) U.S. Cl.
CPC ..... *G02F 1/133317* (2021.01); *G02B 6/0066* (2013.01); *G02B 6/0088* (2013.01); *G02F 2202/28* (2013.01)

(58) Field of Classification Search
CPC .............. G02F 1/133317; G02F 2202/28
See application file for complete search history.

(56) References Cited

U.S. PATENT DOCUMENTS 8,144,285 B2 * 3/2012 Tang ................. G02F 1/133308
349/60
RE47,419 E * 6/2019 Hsu ................... G02F 1/133308
(Continued)

FOREIGN PATENT DOCUMENTS

CN    102606943 A    7/2012
CN    203215440 U    9/2013
(Continued)

*Primary Examiner* — Keith G. Delahoussaye
(74) *Attorney, Agent, or Firm* — Ling Wu; Stephen Yang; Ling and Yang Intellectual Property

(57) ABSTRACT

A backlight module includes a back plate, a plastic frame disposed on one side of the back plate and connected with the back plate, a light source assembly located on an inner side of the plastic frame, and a reflective sheet, a light guide plate, and an optical membrane group sequentially stacked and located on the inner side of the plastic frame; the light source assembly includes a circuit board and a light source disposed on a first side surface of the circuit board, and the light source is located at a first side edge of the light guide plate; the light guide plate includes a first surface facing the reflective sheet and a second surface facing away from the reflective sheet; a first rectangular annular step and a second rectangular annular step are provided on an end face of the plastic frame facing the back plate.

15 Claims, 3 Drawing Sheets

(56) References Cited

U.S. PATENT DOCUMENTS

| | | | | |
|---|---|---|---|---|
| 2012/0013818 | A1* | 1/2012 | Park | G02F 1/133308 |
| | | | | 349/58 |
| 2012/0162565 | A1* | 6/2012 | Lee | G02F 1/133308 |
| | | | | 349/62 |
| 2013/0107571 | A1* | 5/2013 | Lin | G02B 6/0055 |
| | | | | 362/609 |

FOREIGN PATENT DOCUMENTS

| | | |
|---|---|---|
| CN | 204423815 U | 6/2015 |
| CN | 105044983 A | 11/2015 |
| CN | 204986629 U | 1/2016 |
| CN | 106154615 A | 11/2016 |
| CN | 107102478 A | 8/2017 |
| KR | 2003-0054879 A | 7/2003 |

\* cited by examiner

BACKLIGHT MODULE, DISPLAY MODULE, AND DISPLAY APPARATUS

CROSS-REFERENCE TO RELATED APPLICATION

The present application is a U.S. National Phase Entry of International Application PCT/CN2022/083455 having an international filing date of Mar. 28, 2022, entitled "Backlight Module, Display Module, and Display Apparatus", and the entire contents of the above-identified application are hereby incorporated by reference.

TECHNICAL FIELD

Embodiments of the present disclosure relate to, but are not limited to, the field of display technologies, and more particularly to a backlight module, a display module, and a display apparatus.

BACKGROUND

At present, liquid crystal display apparatuses are often used in vehicle-mounted display apparatuses. A backlight module of some vehicle-mounted liquid crystal display apparatuses includes a plastic frame, a back plate, a light source, a light guide plate, and an optical membrane, etc. The light guide plate is usually in an active state inside the backlight module, and overall stability of the backlight module is insufficient, which affects a display effect.

SUMMARY

The following is a summary of subject matter described herein in detail. The summary is not intended to limit the protection scope of claims.

An embodiment of the present disclosure provides a backlight module, including a back plate, a plastic frame disposed on one side of the back plate and connected with the back plate, a light source assembly located on an inner side of the plastic frame, and a reflective sheet, a light guide plate, and an optical membrane group located on the inner side of the plastic frame and stacked in turn; the light source assembly includes a circuit board and a light source disposed on a first side surface of the circuit board, and the light source is located at a first side edge of the light guide plate; the light guide plate includes a first surface facing the reflective sheet and a second surface facing away from the reflective sheet; a first rectangular annular step and a second rectangular annular step are provided on an end face of the plastic frame facing the back plate, a portion of the reflective sheet close to an outer edge of the reflective sheet is bonded to the first rectangular annular step through a first double-sided adhesive tape, and the reflective sheet is also bonded by the first double-sided adhesive tape to a portion of the first surface of the light guide plate close to a remaining side edge of the light guide plate except the first side edge; a portion of the second surface of the light guide plate close to the outer edge of the reflective sheet is disposed toward the second rectangular annular step, and a portion of the second surface of the light guide plate close to the first side edge is fixed on the second rectangular annular step.

An embodiment of the present disclosure further provides a display module including a display panel and the backlight module.

An embodiment of the present disclosure further provides a display device, which includes the display module.

Other aspects may be understood upon reading and understanding the drawings and detailed description.

BRIEF DESCRIPTION OF DRAWINGS

The drawings are intended to provide a further understanding of technical solutions of the present disclosure and constitute a part of the specification, and are used for explaining the technical solutions of the present disclosure together with embodiments of the present disclosure, and not intended to constitute limitations on the technical solutions of the present disclosure. Shapes and sizes of components in the drawings do not reflect actual scales, and are only intended to schematically illustrate contents of the present disclosure.

Reference signs are as follows.

11—back plate, 12—plastic frame, 13—light source assembly, 14—reflective sheet, 15—light guide plate, 16—optical membrane group, 21—first double-sided adhesive tape, 22—second double-sided adhesive tape, 23—third double-sided adhesive tape, 31—first adhesive tape, 32—second adhesive tape, 41—fixation frame, 51—display panel, 111—bottom plate, 112—side plate, 121—first rectangular annular step, 122—second rectangular annular step, 123—third rectangular annular step, 124—transition surface, 125—avoidance groove, 126—first fixation boss, 127—clamping groove, 128—second fixation boss, 131—circuit board, 132—light source, 161—first lug, 161a—first lug of first optical membrane, 161b—first lug of second optical membrane, 161c—first lug of third optical membrane, 162—second lug, 411—frame plate, 412—baffle plate, 1201—first bezel, 1202—second bezel, 1203—third bezel, 1204—fourth bezel, 1221—accommodation groove.

DETAILED DESCRIPTION

Those of ordinary skills in the art should understand that modifications or equivalent replacements may be made to the technical solutions of the embodiments of the present disclosure without departing from the spirit and scope of the technical solutions of the embodiments of the present disclosure, and should all fall within the scope of the claims of the present disclosure.

Figure 1:
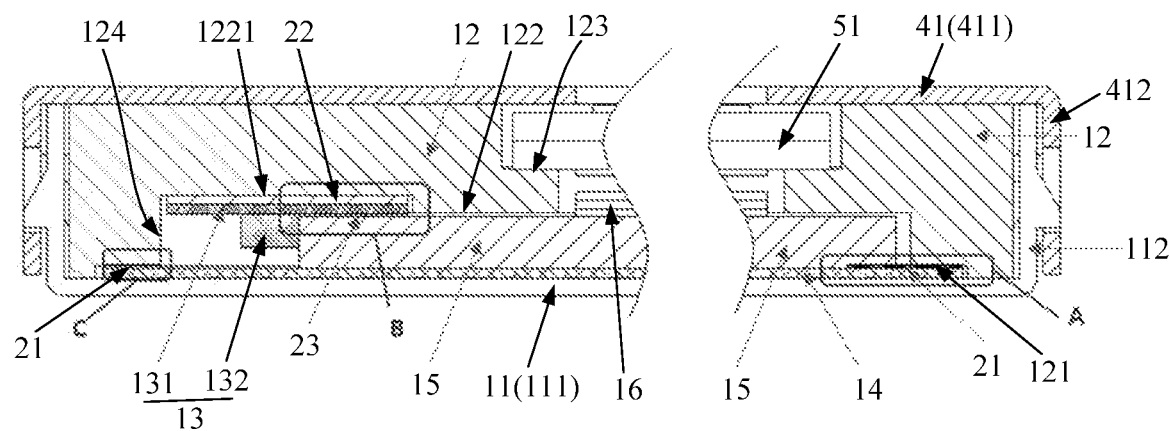
FIG. 1 is a schematic diagram of a cross-sectional structure of a display module according to some exemplary embodiments.

An embodiment of the present disclosure provides a backlight module. In some exemplary embodiments, as shown in FIG. 1, FIG. 1 is a schematic diagram of a cross-sectional structure of a display module according to some exemplary embodiments. The backlight module includes a back plate 11, a plastic frame 12 disposed on one side of the back plate 11 and connected with the back plate 11, a light source assembly 13 located on an inner side of the plastic frame 12, and a reflective sheet 14, a light guide plate 15, and an optical membrane group 16 sequentially stacked and located on the inner side of the plastic frame 12.

The light source assembly 13 includes a circuit board 131 and a light source 132 disposed on a first side surface of the circuit board 131. The light source 132 is located at a first side edge of the light guide plate 15, the light guide plate 15 includes a first surface facing the reflective sheet 14 and a second surface facing away from the reflective sheet 14.

A first rectangular annular step 121 and a second rectangular annular step 122 are provided on an end face of the plastic frame 12 facing the back plate 11. A portion of the reflective sheet 14 close to an outer edge thereof is bonded to the first rectangular annular step 121 through a first double-sided adhesive tape 21. The reflective sheet 14 is also bonded by the first double-sided adhesive tape 21 to a portion of the first surface of the light guide plate 15 close to remaining side edges except the first side edge.

A portion of the second surface of the light guide plate 15 close to an outer edge thereof is disposed toward the second rectangular annular step 122, and a portion of the second surface of the light guide plate 15 close to the first side edge is fixed on the second rectangular annular step 122.

According to the backlight module of the embodiment of the present disclosure, the reflective sheet 14 and the light guide plate 15 may be respectively limited and fixed through the first rectangular annular step 121 and the second rectangular annular step 122 disposed on the plastic frame 12, the reflective sheet 14 is fixed on the first rectangular annular step 121 through the first double-sided adhesive tap 21, the reflective sheet 14 is bonded to the portion of the first surface of the light guide plate 15 close to the remaining side edges except the first side edge, and the portion of the second surface of the light guide plate 15 close to the first side edge is fixed on the second rectangular annular step 122. In this way, the reflective sheet 14, the light guide plate 15, and the plastic frame 12 are fixed together to form a whole, and the light guide plate 15 and the reflective sheet 14 may be prevented from moving inside the backlight module, which is conducive to enhancing overall stability of the backlight module and facilitating assembling of the backlight module.

In some exemplary embodiments, as shown in FIG. 1, the second rectangular annular step 122 may be provided with an accommodation groove 1221, a side surface of the circuit board 131 facing away from the light source 132 is bonded inside the accommodation groove 1221 through a second double-sided adhesive tape 22, and a portion of the second surface of the light guide plate 15 close to the first side edge is bonded to the first side surface of the circuit board 131 through a third double-sided adhesive tape 23, as shown by B in FIG. 1.

In this embodiment, the light source assembly 13 is fixed on the plastic frame 12, and a portion of the second surface of the light guide plate 15 close to the first side edge is fixed on the circuit board 131 of the light source assembly 13, so that the light source assembly 13, the reflective sheet 14, the light guide plate 15, and the plastic frame 12 may be fixed together to form a whole, which is convenient to be assembled with the back plate 11, and stability of the whole backlight module may be enhanced. By disposing the circuit board 131 of the light source assembly 13 inside the accommodation groove 1221, the first side surface of the circuit board 131 is substantially flush with a surface of the second rectangular annular step 122, thereby avoiding damage to the light guide plate 15 caused by an uneven surface.

Figure 2:
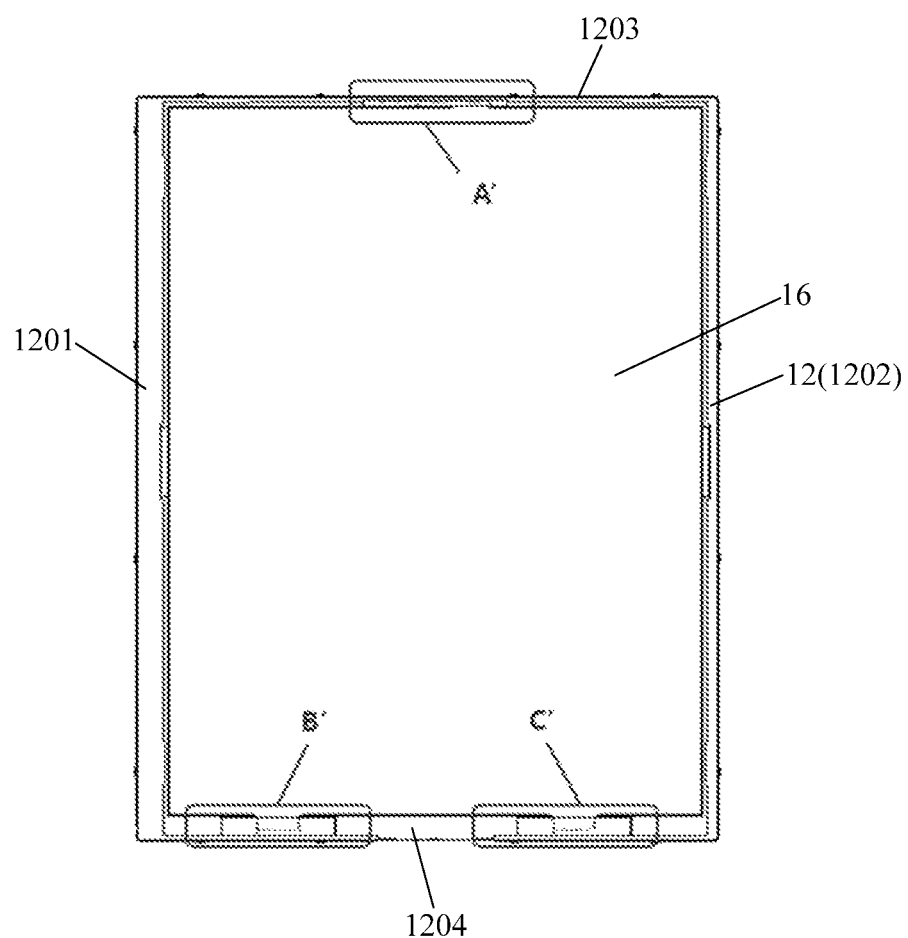
FIG. 2 is a schematic diagram of a top view of a structure of a backlight module in FIG. 1 in some exemplary embodiments.

Exemplarily, as shown in FIG. 2, FIG. 2 is a schematic diagram of a top view of a structure of the backlight module in FIG. 1 in some exemplary embodiments. The plastic frame 12 may be rectangular and the plastic frame 12 may include a first bezel 1201 and a second bezel 1202 which are opposite to each other, and a third bezel 1203 and a fourth bezel 1204 which are opposite to each other. Accordingly, the reflective sheet 14 and the light guide plate 15 may both have rectangular shapes, the light guide plate 15 and the reflective sheet 14 each include a first side edge and a second side edge which are opposite to each other, and a third side edge and a fourth side edge which are opposite to each other. A first side edge, a second side edge, a third side edge, and a fourth side edge of the light guide plate 15 are respectively disposed close to the first bezel 1201, the second bezel 1202, the third bezel 1203, and the fourth bezel 1204 of the plastic frame 12. As shown in FIGS. 1 and 2, the accommodation groove 1221 may be provided on the first bezel 1201, the circuit board 131 may be an elongated flexible circuit board or a hard circuit board, and the accommodation groove 1221 may extend along a length direction of the first bezel 1201. A portion of the reflective sheet 14 close to an outer edge (four side edges) thereof is bonded on the first rectangular annular step 121 through the first double-sided adhesive tape 21, the reflective sheet 14 is also bonded to portions of the first surface of the light guide plate 15 close to the second side edge, the third side edge, and the fourth side edge through the first double-sided adhesive tape 21, as shown by A in FIG. 1, and a portion of the first surface of the light guide plate 15 close to the first side edge is not bonded to the reflective sheet 14, as shown by C in FIG. 1.

In other implementation modes, the portion of the second surface of the light guide plate close to the first side edge may be bonded on the second rectangular annular step through a fourth double-sided adhesive tape. The plastic frame includes a transition surface connected between the first rectangular annular step and the second rectangular annular step, and the side surface of the circuit board of the light source assembly facing away from the light source may be fixed on the transition surface through a double-sided adhesive tape.

In some exemplary embodiments, as shown in FIG. 1, the plastic frame 12 includes a transition surface 124 connected between the first rectangular annular step 121 and the second rectangular annular step 122. The light source 132 is located between the first side edge of the light guide plate 15 and the transition surface 124, and a distance between the first side edge of the light guide plate 15 and the transition surface 124 is greater than a distance between a remaining side edge of the light guide plate 15 and the transition surface 124. In this way, there may be enough space between the first side edge of the light guide plate 15 and the transition surface 124 to accommodate the light source assembly 13, and it is convenient for the first double-sided adhesive tape 21 to bond the portion of the first surface of the light guide plate 15 close to the remaining side edge except the first side edge to the reflective sheet 14.

In some exemplary embodiments, as shown in FIG. 1, a third rectangular annular step 123 may be provided on an end face of the plastic frame 12 facing away from the back plate 11, and the third rectangular annular step 123 is configured to limit a portion of a display panel 51 facing away from a display side close to an outer edge.

In some exemplary embodiments, as shown in FIG. 1, the back plate 11 may include a bottom plate 111 and a side plate 112 disposed at an outer edge of the bottom plate 111, and the side plate 112 is disposed around an outer side of the plastic frame 12. Exemplarily, the plastic frame 12 may be snap-fitted with the side plate 112 through a snap to fix the plastic frame 12 and the back plate 11 with each other.

In some exemplary embodiments, as shown in FIG. 1, the optical membrane group 16 may include multiple optical membranes that are stacked. Exemplarily, the optical membrane group 16 may include three optical membranes that are stacked, along a direction away from the light guide plate 15. The three optical membranes may be sequentially a diffusion sheet, a first prism sheet, and a second prism sheet. The diffusion sheet may further homogenize light emitted from the second surface of the light guide plate 15, and the first prism sheet and the second prism sheet may converge light emitted from the diffusion sheet in a front direction, and play a role in brightening. In other implementation modes, a quantity of optical membranes of the optical membrane group may be three or more, etc.

Figure 3:
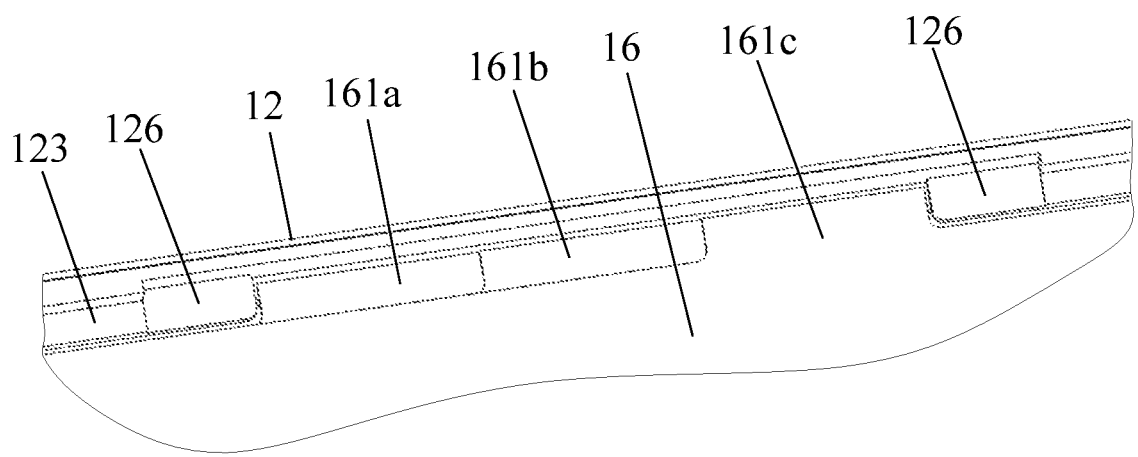
FIG. 3 is a schematic diagram of a partial structure of the backlight module of FIG. 2 at A' in some exemplary embodiments.
Figure 4:
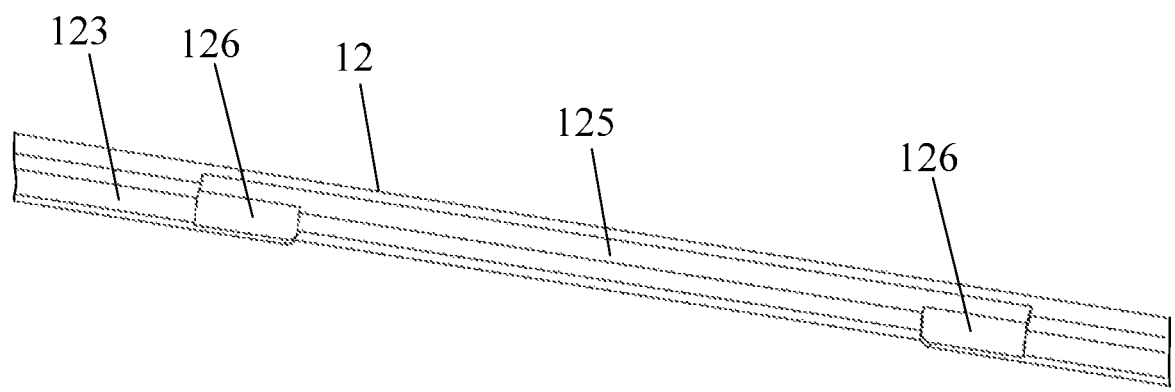
FIG. 4 is a schematic diagram of a partial structure of a plastic frame in FIG. 3.
Figure 5:
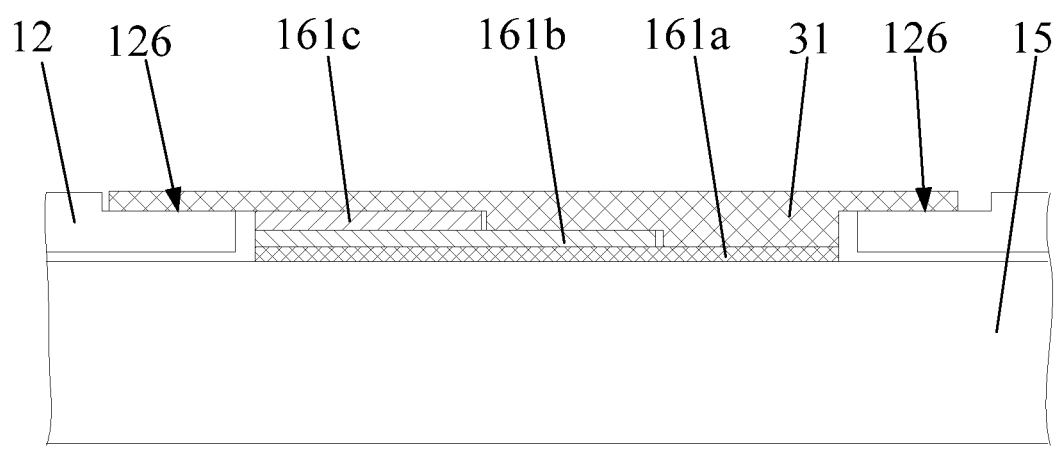
FIG. 5 is a schematic diagram of a partial cross-sectional structure of the backlight module of FIG. 2 at A' in some exemplary embodiments.

In some exemplary embodiments, as shown in FIGS. 3, 4, and 5, FIG. 3 is a schematic diagram of a partial structure of the backlight module of FIG. 2 at A' in some exemplary embodiments, FIG. 4 is a schematic diagram of a partial structure of a plastic frame in FIG. 3, and FIG. 5 is a schematic diagram of a partial cross-sectional structure of the backlight module of FIG. 2 at A' in some exemplary embodiments. The optical membrane group 16 includes multiple optical membranes that are stacked, an avoidance groove 125 is provided on at least one bezel of the plastic frame 12, and a first lug 161 is provided on a side edge of each optical membrane close to the avoidance groove 125. The first lug 161 of each optical membrane extends into the avoidance groove 125 and is fixed inside the avoidance groove 125 through a first adhesive tape 31.

In an example of this embodiment, as shown in FIGS. 3, 4, and 5, the plastic frame 12 is provided with a first fixation boss 126 on each of two sides of the avoidance groove 125, and the first adhesive tape 31 is provided with a bonding surface facing the optical membranes. The bonding surface of the first adhesive tape 31 is provided with a step structure, two ends of the first adhesive tape 31 are respectively bonded on two first fixation bosses 126, and each step of the step structure is bonded to a corresponding one of the first lugs 161, thereby fixing the first lug 161 of each optical membrane inside the avoidance groove 125. Exemplarily, the avoidance groove 125 may be provided at the third rectangular annular step 123, a surface of the first fixation boss 126 that is bonded to the first adhesive tape 31 may be lower than a surface of the third rectangular annular step 123 that faces away from the light guide plate 15, and a surface of the first adhesive tape 31 that faces away from the bonding surface may be substantially flush with the surface of the third rectangular annular step 123 that faces away from the light guide plate 15.

Exemplarily, as shown in FIG. 3 and FIG. 5, multiple first lugs may be stacked, in two adjacent optical membranes, a first lug of an optical membrane away from the light guide plate partially exposes a first lug of an optical membrane close to the light guide plate. Taking a case in which the optical membrane group 16 includes three optical membranes as an example, along a direction away from the light guide plate 15, the three optical membranes are sequentially a first optical membrane, a second optical membrane, and a third optical membrane. A first lug 161b of the second optical membrane partially exposes a first lug 161a of the first optical membrane, and a first lug 161c of the third optical membrane partially exposes the first lug 161b of the second optical membrane. An exposed portion of the first lug 161a of the first optical membrane, an exposed portion of the first lug 161b of the second optical membrane, and the first lug 161c of the third optical membrane are formed in a step shape so as to be correspondingly bonded to each step of the step structure of the first adhesive tape 31. An avoidance groove 125 may be disposed on one bezel of the plastic frame 12, and the avoidance groove 125 may extend along a length direction of one bezel of the plastic frame 12 where the avoidance groove 125 is located.

Figure 6:
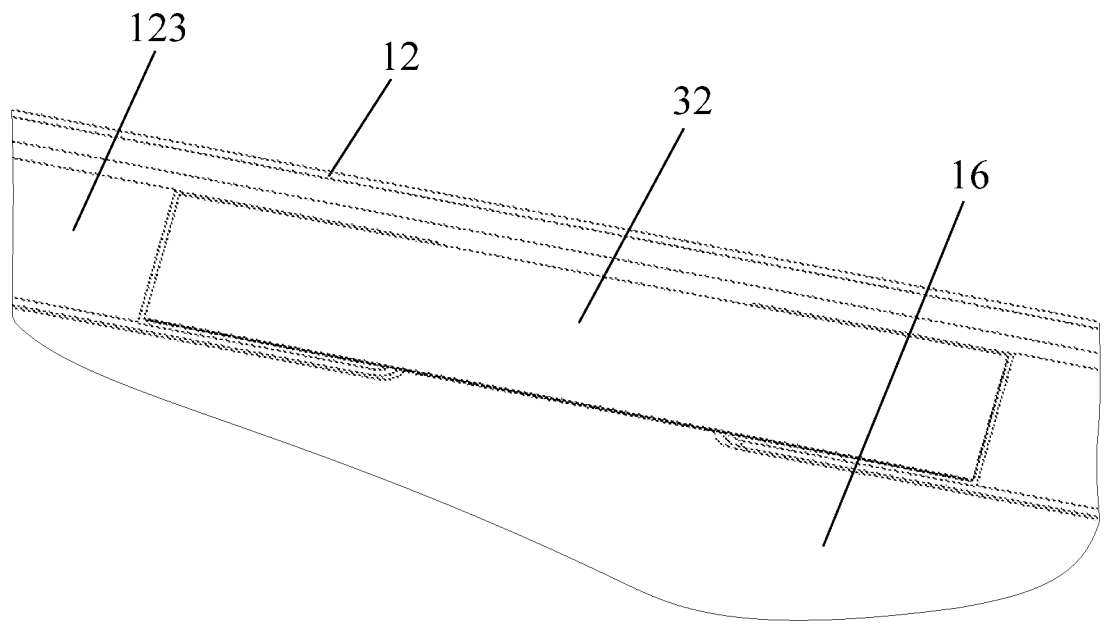
FIG. 6 is a schematic diagram of a partial structure of the backlight module of FIG. 2 at B' or C' in some exemplary embodiments.
Figure 7:
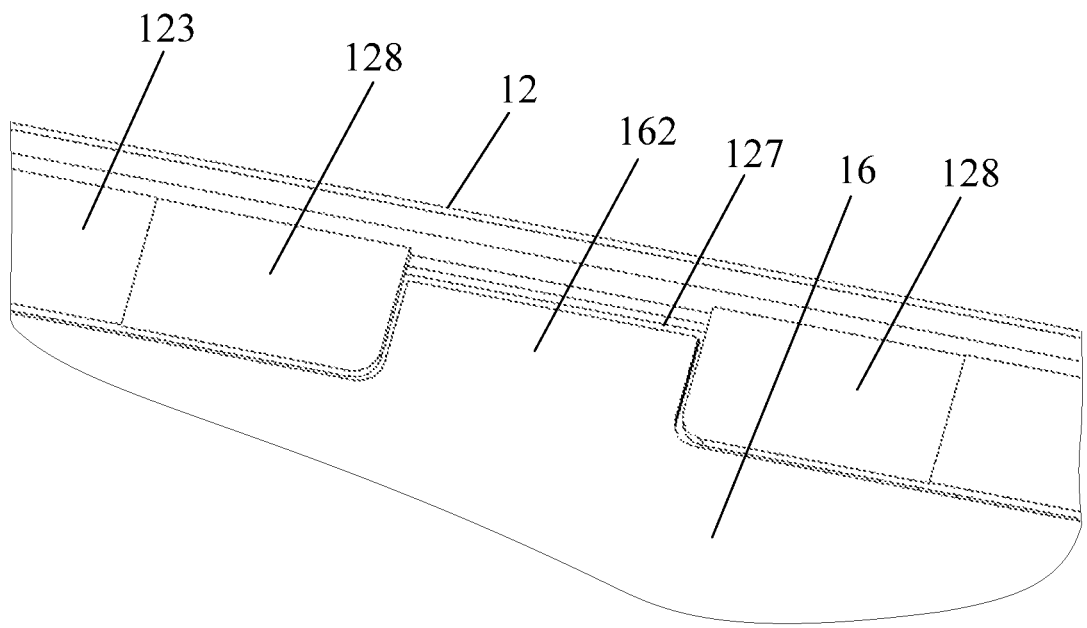
FIG. 7 is a schematic diagram of a partial structure after a second adhesive tape is removed in FIG. 6.

In some exemplary embodiments, as shown in FIG. 6 and FIG. 7, FIG. 6 is a schematic diagram of a partial structure of the backlight module of FIG. 2 at B' or C' in some exemplary embodiments, FIG. 7 is a schematic diagram of a partial structure after a second adhesive tape is removed in FIG. 6. The optical membrane group 16 includes multiple optical membranes that are stacked, at least one bezel of the plastic frame 12 is provided with a clamping groove 127, and a second lug 162a is provided on a side edge of each optical membrane close to the clamping groove 127, and multiple second lugs 162 are stacked and extend into the clamping groove 127. In this embodiment, the clamping groove 127 cooperates with the multiple second lugs 162, which may play a role of limiting each of the optical membranes.

Exemplarily, as shown in FIG. 6 and FIG. 7, the plastic frame 12 may be provided with a second fixation boss 128 on each of two sides of the clamping groove 127, and the second fixation boss 128 is bonded with a second adhesive tape 32, the second adhesive tape 32 crosses the clamping groove 127 and is located on a side of the multiple second lugs 162 facing away from the light guide plate 15, and the second adhesive tape 32 is not bonded to the second lugs 162. The second adhesive tape 32 may play a role of limiting to prevent the multiple second lugs 162 from jumping out of the clamping groove 127, and the second adhesive tape 32 is not bonded to the second lugs 162, so that the optical membranes will not be deformed due to being completely fixed when thermal expansion occurs.

Exemplarily, as shown in FIG. 6 and FIG. 7, one or more clamping grooves 127 may be provided on one bezel of the plastic frame 12, and sizes of the multiple second lugs 162 may be the same or different. The clamping groove 127 may be provided at the third rectangular annular step 123, a surface of the second fixation boss 128 that is bonded to the second adhesive tape 32 may be lower than the surface of the third rectangular annular step 123 that faces away from the light guide plate 15, and a surface of the second adhesive tape 32 that faces away from the bonding surface may be substantially flush with the surface of the third rectangular annular step 123 that faces away from the light guide plate 15. The clamping groove and the avoidance groove may be respectively disposed on different bezels of the plastic frame. For example, as shown in FIG. 2, the avoidance groove may be disposed on the third bezel 1203 of the plastic frame 12, and the clamping groove is disposed on the fourth bezel 1204 of the plastic frame 12.

An embodiment of the present disclosure further provides a display module, and the display module includes a display panel and a backlight module described in any one of preceding contents.

In an example of this embodiment, as shown in FIG. 1, a third rectangular annular step 123 may be provided on an end face of the plastic frame 12 facing away from the back plate 11, the display panel 51 is located on an inner side of the plastic frame 12, and a portion of a surface of the display panel 51 facing away from a display side surface close to an outer edge thereof is disposed toward the third rectangular annular step 123. Exemplarily, a double-sided tape may be provided on the third rectangular annular step 123 to fix the display panel 51, or the display panel 51 may not be fixed with the third rectangular annular step 123, and a buffer layer may be provided on the third rectangular annular step 123 to protect the display panel 51. The display panel 51 may be a liquid crystal display panel or the like.

Exemplarily, as shown in FIG. 1, the display module may further include a fixation frame 41 connected with the backlight module, the fixation frame 41 includes a frame plate 411, wherein the frame plate 411 abuts against an end face of the plastic frame 12 facing away from the back plate 11 and is located at a portion of a display surface of the display panel 51 close to an outer edge thereof. In this way, the portion of the display panel 51 close to the outer edge may be clamped and fixed by the frame plate 411 of the fixation frame 41 and the third rectangular annular step 123 of the plastic frame 12. Exemplarily, the fixation frame 41 may further include a baffle plate 412 connected with an outer peripheral edge of the frame plate 411, and the baffle plate 412 may be snapped and fixed with the side plate 112 of the back plate 11 through a snap structure, for example, a clamping groove may be provided on the baffle plate 412, and a snap matched with the clamping groove may be provided on the side plate 112 of the back plate 11.

A display apparatus is further provided in an embodiment of the present disclosure, which includes the display module described in any of the aforementioned embodiments. The display apparatus may be any product or component with a display function, such as a mobile phone, a tablet computer, a television, a display, a laptop computer, a digital photo frame, and a navigator.

In the accompanying drawings, a size of a constituent element, and a thickness of a layer or a region are sometimes exaggerated for clarity. Therefore, an implementation of the present disclosure is not necessarily limited to the size, and the shape and size of each component in the drawings do not reflect an actual scale. In addition, the drawings schematically illustrate some examples, and an implementation of the present disclosure is not limited to the shapes or numerical values shown in the drawings.

In the description herein, "parallel" refers to a state in which an angle formed by two straight lines is above −10° and below 10°, and thus also includes a state in which the angle is above −5° and below 5°. In addition, "vertical" refers to a state in which an angle formed by two straight lines is above 80° and below 100°, and thus also includes a state in which the angle is above 850 and below 95°.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the description herein, unless otherwise specified and defined explicitly, terms "connection", "fixed connection", "installation" and "assembly" should be understood in a broad sense, and, for example, they may be a fixed connection, a detachable connection or an integrated connection; the terms "installation", "connection" and "fixed connection" may be a direct connection, an indirect connection through intermediate components, or an inner communication between two components. For those ordinarily skilled in the art, meanings of the above terms in the embodiments of the present disclosure may be understood according to situations.

The invention claimed is:

1. A backlight module, comprising a back plate, a plastic frame disposed on one side of the back plate and connected with the back plate, a light source assembly located on an inner side of the plastic frame, and a reflective sheet, a light guide plate, and an optical membrane group sequentially stacked and located on the inner side of the plastic frame;
   wherein the light source assembly comprises a circuit board and a light source disposed on a first side surface of the circuit board, and the light source is located at a first side edge of the light guide plate; the light guide plate comprises a first surface facing the reflective sheet and a second surface facing away from the reflective sheet;
   a first rectangular annular step and a second rectangular annular step are provided on an end face of the plastic frame facing the back plate, a portion of the reflective sheet close to an outer edge of the reflective sheet is bonded to the first rectangular annular step through a first double-sided adhesive tape, and the reflective sheet is also bonded by the first double-sided adhesive tape to a portion of the first surface of the light guide plate close to a remaining side edge of the light guide plate except the first side edge; and
   a portion of the second surface of the light guide plate close to the outer edge of the reflective sheet is disposed toward the second rectangular annular step, and a portion of the second surface of the light guide plate close to the first side edge is fixed on the second rectangular annular step.

2. The backlight module according to claim 1, wherein the second rectangular annular step is provided with an accommodation groove, a side surface of the circuit board facing away from the light source is bonded inside the accommodation groove through a second double-sided adhesive tape, and the portion of the second surface of the light guide plate close to the first side edge is bonded to the first side surface of the circuit board through a third double-sided adhesive tape.

3. The backlight module according to claim 1, wherein the portion of the second surface of the light guide plate close to the first side edge is bonded on the second rectangular annular step through a fourth double-sided adhesive tape.

4. The backlight module according to claim 1, wherein the plastic frame comprises a transition surface connected between the first rectangular annular step and the second rectangular annular step; the light source is located between the first side edge of the light guide plate and the transition surface, and a distance between the first side edge of the light guide plate and the transition surface is greater than a distance between the remaining side edge of the light guide plate and the transition surface.

5. The backlight module according to claim 1, wherein the optical membrane group comprises a plurality of optical membranes that are stacked, an avoidance groove is disposed on at least one bezel of the plastic frame, a first lug is disposed on a side edge of each optical membrane close to the avoidance groove, and the first lug of each optical membrane extends into the avoidance groove and is fixed inside the avoidance groove through a first adhesive tape.

6. The backlight module according to claim 5, wherein the plastic frame is provided with a first fixation boss on each of two sides of the avoidance groove, the first adhesive tape is provided with a bonding surface facing the optical membranes, the bonding surface of the first adhesive tape is provided with a step structure, two ends of the first adhesive tape are respectively bonded on the two first fixation bosses, and each step of the step structure is bonded to a corresponding first lug.

7. The backlight module according to claim 5, wherein the plurality of first lugs are stacked, in two adjacent optical membranes, a first lug of an optical membrane away from the light guide plate partially exposes a first lug of an optical membrane close to the light guide plate.

8. The backlight module according to claim 1, wherein the optical membrane group comprises a plurality of optical membranes that are stacked, a clamping groove is disposed on at least one bezel of the plastic frame, a second lug is disposed on a side edge of each optical membrane close to the clamping groove, and a plurality of second lugs are stacked and extend into the clamping groove.

9. The backlight module according to claim 8, wherein the plastic frame is provided with a second fixation boss on each of two sides of the clamping groove, and the second fixation boss is bonded with a second adhesive tape, the second adhesive tape crosses the clamping groove and is located on a side of the plurality of second lugs facing away from the light guide plate, and the second adhesive tape is not bonded to the second lugs.

10. The backlight module according to claim 1, wherein a third rectangular annular step is provided on an end face of the plastic frame facing away from the back plate, and the third rectangular annular step is configured to limit a portion of a display panel facing away from a display side close to the outer edge.

11. The backlight module according to claim 1, wherein the backlight comprises a bottom plate and a side plate disposed at an outer edge of the bottom plate, and the side plate is disposed around an outer side of the plastic frame.

12. A display module, comprising a display panel and the backlight module according to claim 1.

13. The display module according to claim 12, wherein a third rectangular annular step is provided on an end face of the plastic frame facing away from the back plate, the display panel is located on an inner side of the plastic frame, and a portion of a surface of the display panel facing away from a display side surface close to an outer edge of the display panel is disposed toward the third rectangular annular step.

14. The display module according to claim 13, further comprising a fixation frame connected with the backlight module, wherein the fixation frame comprises a frame plate, the frame plate abuts against the end face of the plastic frame facing away from the back plate and is located at a portion of a display surface of the display panel close to the outer edge of the display panel.

15. A display apparatus, comprising the display module according to claim 12.

* * * * *